United States Patent
Kalowski

Patent Number: 5,323,731
Date of Patent: Jun. 28, 1994

[54] WATER FILTER GAUGE FOR COFFEE BREWER

[75] Inventor: Thaddeus J. Kalowski, Lisle, Ill.

[73] Assignee: Specialty Equipment Companies, Inc., Chicago, Ill.

[21] Appl. No.: 993,812

[22] Filed: Dec. 18, 1992

Related U.S. Application Data

[63] Continuation of Ser. No. 796,450, Nov. 22, 1991, abandoned.

[51] Int. Cl.⁵ ............................................. G01L 19/12
[52] U.S. Cl. .................................... 116/272; 116/266
[58] Field of Search ........................ 73/744; 99/285; 116/34 R, 266, 272, DIG. 25, DIG. 42; 137/557; 210/90

[56] References Cited

U.S. PATENT DOCUMENTS

| | | | |
|---|---|---|---|
| 2,002,883 | 5/1935 | Deming | 116/272 |
| 3,067,618 | 12/1962 | Briechle | 73/744 |
| 3,068,703 | 12/1962 | Morton | 73/744 |
| 3,200,787 | 8/1965 | Darnell | 137/557 |
| 4,527,429 | 7/1985 | Combest et al. | 73/744 |

Primary Examiner—William A. Cuchlinski, Jr.
Assistant Examiner—W. Morris Worth
Attorney, Agent, or Firm—Myers & Associates, Ltd.

[57] ABSTRACT

A filter gauge comprising a piston operable in a pressurized cylinder, the piston having a rod which projects from the cylinder, and grippers mounted within the cylinder and accommodating movement of the piston and rod having indicia indicating the lowest pressure reached in the cylinder as a water conduit to which the cylinder is connected is being drained. The grippers prevent the rod from moving in the opposite or extending direction as the cylinder is being pressured gradually by the water seeping through the filter and equalizing the pressure at both sides thereof.

6 Claims, 1 Drawing Sheet

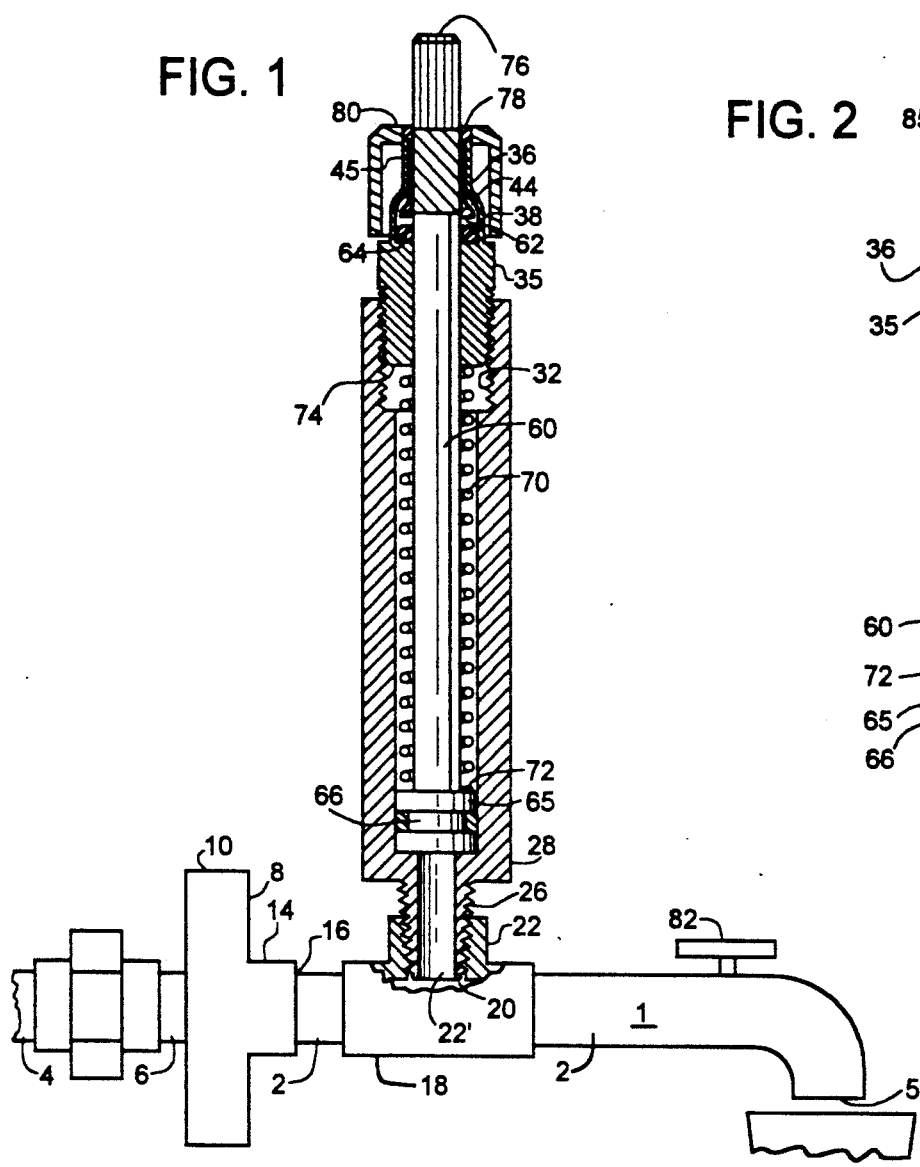
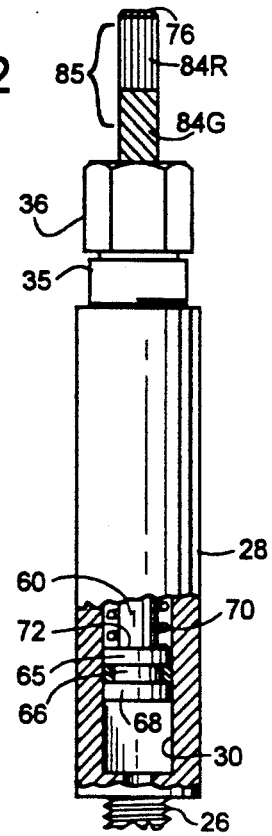
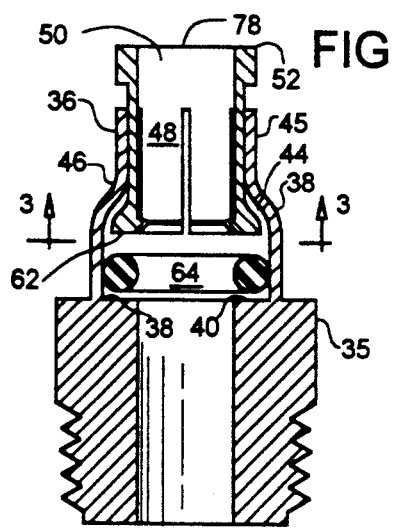
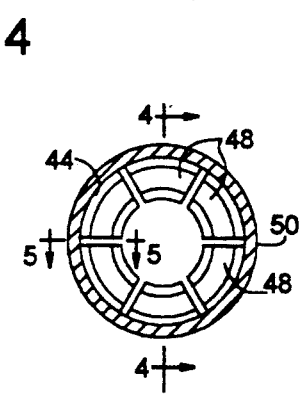
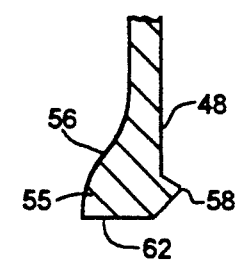

WATER FILTER GAUGE FOR COFFEE BREWER

This is a continuation of co-pending application Ser. No. 796,450 filed Nov. 22, 1991, now abandoned.

BACKGROUND OF THE INVENTION

This invention is directed to a gauge for indicating the status of a water filter which if sufficiently clogged will inhibit the delivery of water to an associated container.

The clogging of the filter is usually not noticeable in that in normal circumstances it occurs over a long period of time and eventually becomes sufficiently clogged which reduces the flow of water to an unacceptable rate. The exchange of filters, is usually tedious and requires draining hot water and replacement of the filter. This seems to occur at an inopportune time when customers are waiting for coffee.

This invention relates to gauges and more specifically to a gauge which measures the effectiveness of a filter which as the filter becomes clogged the gauge registers an indicia which informs the serviceman of the status of the filter for replacement before it becomes plugged to an extent where it no longer functions.

DISCUSSION OF THE PRIOR ART

Discussion of the Prior Art

The best art found is U.S. Pat. No. 2,002,883 which shows a cap or indicator button having a normal position depressed within an aperture of a pressure housing, the button having prongs frictionally hugging a stem which is operable to extend the button from the aperture to indicate abnormal pressure in the regulator.

U.S. Pat. No. 3,067,618 shows an air pressure gauge in which the pressure indicator stem is grasped non-positively by a pair of spring arms to hold it in place, but does not function as the instant invention.

U.S. Pat. No. 3,068,703 is also a tire air pressure gauge similar to the previously described patent.

U.S. Pat. No. 4,527,429 discloses a gauge with a piston operating in a cylinder, the piston being spring-biased to operate a valve to closed position. As pressure increases, the ball is unseated and the piston moves up and registers its upper end with the lines showing the amount of pressure within the system.

SUMMARY OF THE INVENTION

A principal object of this invention is to provide a novel pressure gauge in a portion of a water line forming a chamber between a filter and an outlet valve. The novel gauge registers the lowest pressure in this portion of the line as the water in the line is being drained. The gauge is prevented from falsely registering normal pressures which develop over a period of time as fluid behind the filter seeps into the chamber.

A primary object of the invention is to provide a reliable gauge which is of simple construction and which is easily readable A further object is to provide a gauge which measures low pressure in a portion of a line to which it is connected and which is not affected by a rise in pressure in said portion of the line as the fluid gradually seeps through the filter until the pressure in the line at opposite sides of the filter become equalized.

The invention comprehends a gauge disposed in a chamber between the outlet end of a water line and a filter disposed between the inlet of the line and the chamber.

These and other objects of the invention will become apparent from the specification and the drawings, wherein:

FIG. 1 is a side elevational view partly in axial section illustrating the invention;

FIG. 2 is a side elevational view of the gauge partly in axial section;

FIG. 3 is an elevational axial section taken substantially on line 3—3 of FIG. 4;

FIG. 4 is an axial section taken substantially on line 4-e of FIG. 3; and

FIG. 5 is a cross-section taken on lines 5—5 of FIG. 3 of a tang portion of the indicator holder.

DESCRIPTION OF THE INVENTION

Referring to the drawings, the fluid or water discharge system generally designated 1 comprises a fluid conduit or line 2 which has an inlet end 4 connected to a source of water supply such as a heater tank (not shown) of a coffee maker and an outlet portion 5.

The conduit or pipe 2 is connected to the inlet 6 of a filter 8 shown here as having a cylindrical housing 10 containing suitable filter material of any well known type.

The housing 10 has an outlet nipple 14 which is connected to one end 16 of a tube or conduit 18 which forms in the outlet portion a fluid chamber portion 20 including a stub 22 which is threaded to a lower end nipple 22' integral with the lower end portion 26 of an elongated cylinder 28 in communication with the outlet portion of the line.

The cylinder 28 has an inner axial bore 30 and an upper internal threaded portion 32 into which is threaded a bushing or piston retainer 35.

The upper end of the retainer has an integral gripper-retainer housing or bonnet 36 which has large diameter lower section 38 merging above its lower edge with the upper edge 40 of the piston holder 35. The housing 36 is swaged intermediate its ends and forms an internal wedge surface 44 converging into a small diameter upper guide section as shown at 45 in guided engagement at 46 with cylindrical sectors of an array of legs 48 of a gripper 50. The legs are defined by axially elongated slots extending from a lower end to an upper end ring or body portion 52 of the gripper 50. The upper end ring 52 is of larger diameter than the upper portion of the sleeve 46 and is spaced axially therefrom and provides a stop thereagainst to limit downward movement of the gripper.

The lower end of each leg 48 of the gripper 50 is provided with an outwardly projecting wedge 55 which has upwardly facing wedge face 56 engageable with the downwardly facing wedge concave 44 of the bonnet. Each leg is provided on the inner side of the associated wedge with a transaxially directed tang 58 which is adapted to pierce into a gauge rod or piston stem 60 to prevent the rod from unrestively moving upwardly for purposes hereinafter described. The tangs are so arranged that they allow the rod to move into the cylinder unrestrictively. The slotted form of legs 48 permit them to flex outward during a downward movement of gauge rod or piston stem 60 in response to pressure drops. During periodic increases in pressure, the legs 48 substantially grip the gauge rod or piston stem 60 so that the tang 58 pierces the gauge rod or piston stem due to the wedging effect between the bonnet of lower end 62 and the internal wedge surface 44.

There is provided within the bonnet between the lower end 62 of the gripper 50 and the upwardly facing surface 40 (FIG. 4) an o-shaped sealing ring 64 which sphincterally embraces the rod 60.

The rod 60 forms a piston stem which at its lower end is provided with a piston head 65 having a peripheral groove 66 in which there is fitted an o-ring 68 which is compressed against the surface of the cylindrical bore of the cylinder.

In operation pressurized fluid is passed through the filter which flows into the lower end of the cylinder bore urging the piston upwardly and compressing a spring 70 sleeved on the rod between the upper side 72 of the piston and the lower end 74 of the piston retainer. The upper end of the rod projects through an aperture in a top wall 78 thereof. The cap 80 has an integral peripheral skirt 80a about the top wall sleeved over the gripper housing.

The upper end of the rod has an end portion 85 which is provided with an upper red band 84R and a green band 84G therebelow.

At full pressure of the water in the chamber 20 with the cap and gripper depressed the pressure acts upon the lower side of the piston and lifts the piston against the spring compressing it between the upper side of the piston and the bottom end of the piston holder and extending the upper end of the rod showing both the red and green bands above the gauge cap top wall 78. As the filter becomes clogged the pressure in the chamber 18 temporarily drops as the water is withdrawn therefrom upon opening the pet cock 82 to drain the portion of the chamber 20. The extent of clogging of the filter is reflected in the pressure of the fluid flowing therethrough the chamber at this time and the piston rod Will move downwardly gradually reducing the extent of the projection of the upper end portion of the rod above the cap wall 78.

Upon the pet cock being closed the water trapped behind the inlet side of the filter will eventually seep into the chamber 20 until the pressure at opposite sides of the filter is equalized. This increase in pressure above that at which the water is delivered through the chamber upon opening the pet cock tends to urge the rod upwardly. This is prevented by the tangs on the gripper piercing the rod and preventing upward movement of the rod. Thus the rod is held to register the lowest pressure. As the filter becomes further clogged the pressure of the water during the draining period of the chamber 20 is gradually reduced at which pressure the gauge rod is locked so that after the pet cock is closed and the pressure equalizes at opposite sides of the filter such increase above the lowest pressure will not push the gauge rod upwardly. As the filter becomes more and more clogged and the pressure during flow through chamber 20 drops, the rod will gradually lower, urged downwardly by the spring, until only the upper red band will show, indicating to the serviceman that the filter needs to be replaced.

After the filter is replaced, to reset the gauge, the cap and the gripper are pressed downwardly releasing the stem or rod and the rod is pushed upwardly compressing the spring. The high pressure prevails in the fluid chamber and thus the rod will not descend at this time. The gripper is manually depressed to disengage the tines from the plastic rod and the rod is manually repositioned to its maximum extent showing both the green and red indicia bands. As the pressure decreases in the line, the rod will gradually descend until only the red end shows above the cap whereupon the filter is replaced.

I claim:

1. A filter gauge for use in a fluid line having a filter with an upstream side and a downstream side comprising a body having a fluid connection on the downstream side of the filter mounted in said fluid line between inlet and outlet portions of the line, said body including indicator means operative to initially record the highest pressure in the outlet portion thereby reflecting a clean filter, said indicator means having indicia indicating pressure level in said outlet portion, said indicator means including a moveable pressure actuated element having said indicia and being operatively connected to said line at said downstream side, and said indicator means including gripper finger means engageable with said moveable pressure actuated element, said gripper finger means having a tang arranged to pierce said pressure actuated element and prevent movement of said pressure actuated element in a direction for indicating intermittent higher pressures and accommodating movement of the pressure actuated element in a direction progressively indicating lower pressure in said outlet portion.

2. A filter gauge for use in a fluid line having a filter with an upstream side and a downstream side comprising a gauge body having a fluid connection on the downstream side of the filter and means for mounting said gauge body in the fluid line between an inlet and an outlet portion of the fluid line, said gauge body including indicator means operative to initially indicate the highest pressure in the outlet portion when the filter is clean, and progressively indicate lower pressures as the filter becomes clogged and means for preventing indication of any subsequently attained intermittent higher pressures in the fluid line, said indicator means comprising a moveable pressure actuated element having indicia, said moveable pressure actuated element being operatively responsive to pressure in the line between the filter and the outlet portion, and said means for preventing indication comprising gripper means for holding said pressure actuated element from moving in a direction indicating said intermittent higher pressures from a previous indication of lower pressures.

3. The gauge according to claim 2, wherein said gripper means includes tangs to pierce into said pressure actuated element to prevent movement of said pressure actuated element in a direction from indicating a lower pressure to a higher pressure.

4. The gauge according to claim 3, wherein said gauge body comprises a cylindrical body with an internal bore communicating with the outlet portion of the fluid line, said pressure actuated element comprising and indicator rod extending axially in said internal bore from one end of the cylindrical body, a piston mounted on one end of said indicator rod operable in said internal bore, said indicator rod having said indicia on said rod positioned externally of the cylindrical body and projecting outwardly from one end thereof, and wherein said gripper means further includes gripper fingers movably mounted within said cylindrical body and being operatively connected to said tangs, and said gripper fingers being in wedging engagement with said cylindrical body during upward movement of said indicator rod for biasing said tangs against the indicator rod to inhibit exit of said indicator rod from said one end of the cylindrical body.

5. The gauge according to claim 4, further including means for manually disengaging the tangs from said indicator rod.

6. The gauge according to claim 5, wherein said means for manually disengaging said gripper fingers comprises a body portion integral with said gripper fingers and abutting said one end of said cylindrical body.

* * * * *